US012493263B2

(12) United States Patent
Shao et al.

(10) Patent No.: US 12,493,263 B2
(45) Date of Patent: Dec. 9, 2025

(54) VOLTAGE CONVERSION APPARATUS, IMAGE-FORMING ASSEMBLY, PROCESS CARTRIDGE, AND PROCESS CARTRIDGE GROUP

(71) Applicant: Zhuhai Pantum Electronics Co., Ltd., Zhuhai (CN)

(72) Inventors: Zhe Shao, Zhuhai (CN); Shiquan Chen, Zhuhai (CN); Xiangchao Xia, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 34 days.

(21) Appl. No.: 18/515,429

(22) Filed: Nov. 21, 2023

(65) Prior Publication Data

US 2024/0168431 A1 May 23, 2024

(30) Foreign Application Priority Data

Nov. 23, 2022 (CN) ......................... 202211470377.4

(51) Int. Cl.
*G03G 21/18* (2006.01)
*G03G 15/00* (2006.01)
*G03G 21/16* (2006.01)

(52) U.S. Cl.
CPC ......... *G03G 21/1867* (2013.01); *G03G 15/80* (2013.01); *G03G 21/1652* (2013.01); *G03G 2221/18* (2013.01)

(58) Field of Classification Search
CPC ............... G03G 15/80; G03G 21/1652; G03G 21/1867; G03G 21/1871; G03G 2221/166; G03G 2221/18
See application file for complete search history.

(56) References Cited

U.S. PATENT DOCUMENTS

| | | | | |
|---|---|---|---|---|
| 10,691,062 B1 * | 6/2020 | Amann | .............. | G03G 21/1867 |
| 2006/0228127 A1 * | 10/2006 | Miyabe | ............. | G03G 21/1652 399/90 |

(Continued)

FOREIGN PATENT DOCUMENTS

| | | |
|---|---|---|
| CN | 1487376 A | 4/2004 |
| CN | 1702569 A | 11/2005 |

(Continued)

OTHER PUBLICATIONS

Machine Translation of JP H07-230195. Aug. 29, 1995. (Year: 1995).*
Machine Translation of CN 103116259. May 22, 2013. (Year: 2013).*

*Primary Examiner* — Carla J Therrien
(74) *Attorney, Agent, or Firm* — Anova Law Group, PLLC

(57) ABSTRACT

The present disclosure provides a voltage conversion apparatus, an image-forming assembly, a process cartridge and a process cartridge group. The voltage conversion apparatus is applied to a process cartridge. The process cartridge includes a first image-forming member and a second image-forming member. The voltage conversion apparatus includes a voltage conversion module, where an input terminal of the voltage conversion module is configured to be electrically connected to the first image-forming member, and an output terminal of the voltage conversion module is configured to be electrically connected to the second image-forming member; and the voltage conversion module is configured to convert a first voltage received by the first image-forming member into a second voltage. The first voltage is a voltage required for the first image-forming member to operate, and the second voltage is a voltage required for the second image-forming member to operate.

20 Claims, 11 Drawing Sheets

(56) References Cited

U.S. PATENT DOCUMENTS

| | | | | |
|---|---|---|---|---|
| 2013/0328992 | A1 | 12/2013 | Hayakawa et al. | |
| 2014/0147139 | A1* | 5/2014 | Hasegawa .......... | G03G 15/0266 399/50 |
| 2018/0321610 | A1 | 11/2018 | Tsujimoto et al. | |
| 2020/0089162 | A1* | 3/2020 | Yoshida ............. | G03G 21/1867 |

FOREIGN PATENT DOCUMENTS

| | | | |
|---|---|---|---|
| CN | 103116259 | A | 5/2013 |
| CN | 211554642 | A | 9/2020 |
| JP | H07230195 | A | 8/1995 |
| JP | 2002287600 | A | 10/2002 |
| JP | 2004233424 | A | 8/2004 |
| WO | 2011131107 | A1 | 10/2011 |

* cited by examiner

VOLTAGE CONVERSION APPARATUS, IMAGE-FORMING ASSEMBLY, PROCESS CARTRIDGE, AND PROCESS CARTRIDGE GROUP

CROSS-REFERENCE TO RELATED APPLICATION

The present disclosure claims the priority to Chinese patent application No. 202211470377.4, filed on Nov. 23, 2022, the entirety of which is incorporated herein by reference.

TECHNICAL FIELD

The present disclosure generally relates to the field of image-forming technology and, more particularly, relates to a voltage conversion apparatus, an image-forming assembly, a process cartridge, and a process cartridge group.

BACKGROUND

Existing solution for electrically connecting process cartridges to the main body side of an image-forming apparatus is that each process cartridge is independently in contact with the main body side of the image-forming apparatus for conduction. Taking regular process cartridges as an example, each process cartridge has four high-voltage contacts, and the four high-voltage contacts of each process cartridge are in contact with conductive contacts on the main body side of the image-forming apparatus to form stable electrical connection. In addition, some image-forming apparatuses, such as color printers, are disposed with four process cartridges, such that at least 16 conductive contacts need to be arranged on the main body side of the image-forming apparatus to ensure stable electrical connection between the image-forming apparatus and the process cartridges.

Above-mentioned existing electrical connection solution between the process cartridges and the main body side of the image-forming apparatus may ensure good electrical conductivity, but more conductive contacts need to be disposed on the main body side of the image-forming apparatus, and the structure may be complicated with high cost. Furthermore, each conductive contact may be subjected to the elastic contact force with a conductive sheet of the process cartridge, so that the main body side of the image-forming apparatus may be subjected to a relatively large force, which may require high strength requirement on the main body side of the image-forming apparatus and also increase cost.

SUMMARY

One aspect of the present disclosure provides a voltage conversion apparatus, applied to a process cartridge, where the process cartridge includes a first image-forming member and a second image-forming member. The voltage conversion apparatus includes a voltage conversion module, where an input terminal of the voltage conversion module is configured to be electrically connected to the first image-forming member, and an output terminal of the voltage conversion module is configured to be electrically connected to the second image-forming member; and the voltage conversion module is configured to convert a first voltage received by the first image-forming member into a second voltage. The first voltage is a voltage required for the first image-forming member to operate, and the second voltage is a voltage required for the second image-forming member to operate.

Another aspect of the present disclosure provides a process cartridge. The process cartridge includes a housing, a first image-forming member, a second image-forming member, and a voltage conversion apparatus. The housing is disposed with an installation portion; and the first image-forming member, the second image-forming member, and the voltage conversion apparatus are respectively installed on the installation portion; and the voltage conversion apparatus includes a voltage conversion module; an input terminal of the voltage conversion module is configured to be electrically connected to the first image-forming member, and an output terminal of the voltage conversion module is configured to be electrically connected to the second image-forming member; and the voltage conversion module is configured to convert a first voltage received by the first image-forming member into a second voltage, where the first voltage is a voltage required for the first image-forming member to operate, and the second voltage is a voltage required for the second image-forming member to operate.

Another aspect of the present disclosure provides a process cartridge group. The process cartridge group includes a first process cartridge, including a first image-forming member, a second image-forming member, a voltage conversion apparatus and a fourth conductive portion, where the second image-forming member is electrically connected to the first image-forming member through the voltage conversion apparatus; the voltage conversion apparatus includes a voltage conversion module; an input terminal of the voltage conversion module is electrically connected to the first image-forming member; an output terminal of the voltage conversion module is electrically connected to the second image-forming member; the voltage conversion module is configured to convert a first voltage received by the first image-forming member into a second voltage, where the first voltage is a voltage required for the first image-forming member to operate, and the second voltage is a voltage required for the second image-forming member to operate; the fourth conductive portion includes a fourth input terminal and a fourth output terminal; the fourth input terminal is electrically connected to the voltage conversion module; and the fourth output terminal is configured to transmit power to an outside of the first process cartridge. The process cartridge group further includes a second process cartridge, including a third image-forming member and a conductive unit, where the conductive unit includes an electric receiving portion and an electric outputting portion; the electric receiving portion is configured to be electrically connected to the fourth output terminal to receive power transmitted by the fourth conductive portion; and the electrical outputting portion is electrically connected to the third image-forming member.

Other aspects of the present disclosure may be understood by those skilled in the art in light of the description, the claims, and the drawings of the present disclosure.

BRIEF DESCRIPTION OF THE DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

Figure 1:
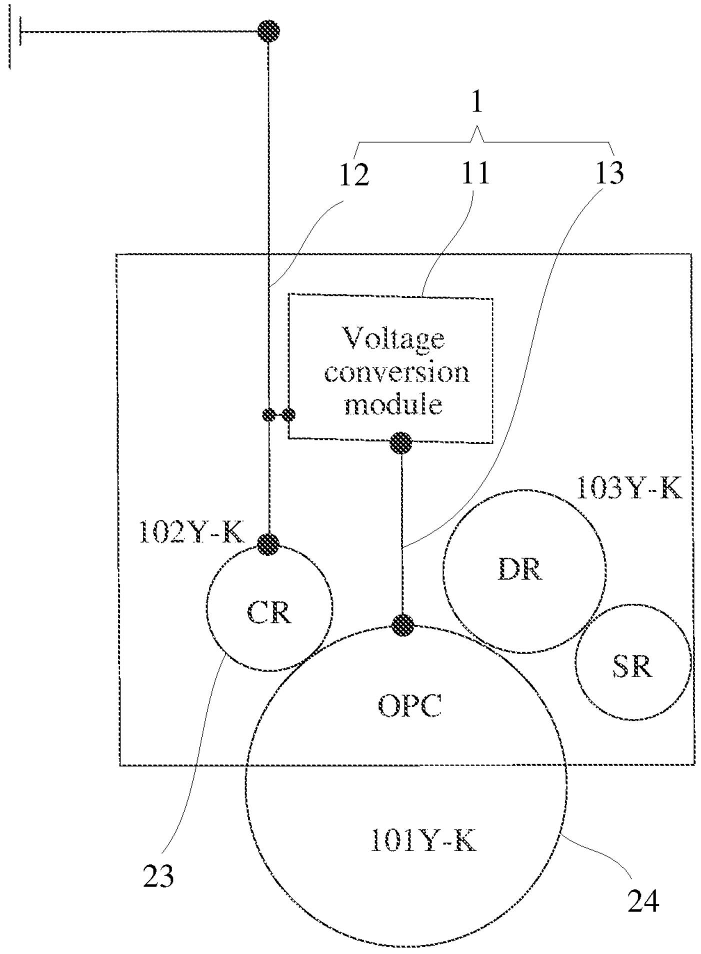
FIG. 1 illustrates a structural schematic of electrical connection between a voltage conversion apparatus and each image-forming member in a process cartridge provided by exemplary embodiments of the present disclosure.

In order to make the objectives, technical solutions and advantages of the present disclosure clearer, the present disclosure is further described in detail below in conjunction with accompanying drawings and embodiments. It should be understood that specific embodiments described here are only used to explain the present disclosure and are not intended to limit the present disclosure.

An image-forming apparatus uses a process cartridge (e.g., a toner cartridge plus a photosensitive drum) to form images. According to the image-forming principle of the process cartridge, different voltages need to be applied to a charging roller, a photosensitive drum, a developing roller and other components in the process cartridge during the image-forming process of the process cartridge. Therefore, each process cartridge needs to be directly or indirectly connected to the main body side of the image-forming apparatus electrically during the operation of the process cartridges.

In the existing technology, each high-voltage contact of each process cartridge is independently in contact with the main body side of the image-forming apparatus for conduction. For example, the photosensitive drum needs to be electrically connected to the main body side of the image-forming apparatus through the conductive connection sheet inside the process cartridge and the high-voltage contact of the photosensitive drum on the end cover of the process cartridge; the steel axle of the charging roller needs to be electrically connected to the main body side of the image-forming apparatus through the conductive connection sheet inside the process cartridge and the high-voltage contact of the charging roller on the end cover of the process cartridge; the steel axle of the developing roller needs to be electrically connected to the main body side of the image-forming apparatus through the conductive connection sheet inside the process cartridge and the high-voltage contact of the developing roller on the end cover of the process cartridge; and the steel axle of the toner supplying roller needs to be electrically connected to the main body side of the image-forming apparatus through the conductive connection sheet inside the process cartridge and the high-voltage contact of the toner supplying roller on the end cover of the process cartridge. In such way, more conductive contacts need to be disposed on the main body side of the image-forming apparatus, and the structure is complicated with high cost. Furthermore, each conductive contact may be subjected to the elastic contact force with a conductive sheet of the process cartridge, so that the main body side of the image-forming apparatus may be subjected to a relatively large force, which may require high strength requirement on the main body side of the image-forming apparatus and also increase cost.

Embodiments of the present disclosure provide a voltage conversion apparatus. The voltage conversion apparatus may be applied to a process cartridge including a first image-forming member and a second image-forming member. The first image-forming member may be any one of the charging roller, the photosensitive drum, the developing roller and the toner supplying roller in the process cartridge. The second image-forming member may be any one of the charging roller, the photosensitive drum, the developing roller and the toner supplying roller in the process cartridge. The first image-forming member and the second image-forming member may be different components. In one embodiment, the first image-forming member may be the charging roller, and the second image-forming member may be photosensitive drum, which is used as an example for illustration.

Figure 2:
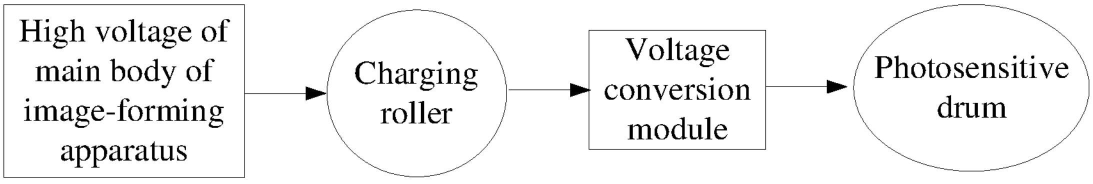
FIG. 2 illustrates a schematic of a voltage transmission path of a voltage conversion apparatus in FIG. 1.

Referring to FIGS. 1-2, FIG. 1 illustrates a structural schematic of electrical connection between the voltage conversion apparatus and each image-forming member in the process cartridge provided by exemplary embodiments of the present disclosure; and FIG. 2 illustrates a schematic of a voltage transmission path of the voltage conversion apparatus in FIG. 1. The voltage conversion apparatus 1 may include a voltage conversion module 11. The input terminal of the voltage conversion module 11 may be configured to be electrically connected to the first image-forming member, and the output terminal of the voltage conversion module 11 may be configured to be electrically connected to the second image-forming member. Therefore, a first voltage received by the first image-forming member may be converted into a second voltage by the voltage conversion module 11, and the second voltage may be provided to the second image-forming member, such that the second image-forming member may obtain a required voltage through the voltage conversion module 11 to operate normally. The first voltage may be a voltage required for the first image-forming member to operate, and the second voltage may be a voltage required for the second image-forming member to operate.

In the present disclosure, the second image-forming member may obtain the voltage from the first image-forming member through the voltage conversion module 11. Therefore, the high-voltage contact for supplying power to the second image-forming member on the end cover of the process cartridge may be cancelled; and the image-forming apparatus may also not need to be disposed with conductive contacts for electrically connecting to above-mentioned high-voltage contacts to transmit power to the second image-forming member, thereby reducing the number of conductive contacts that need to be disposed on the main body side of the image-forming apparatus. Furthermore, the force between the main body side of the image-forming apparatus and the process cartridge may be decreased, the strength requirement of the main body side of the image-forming apparatus may be reduced, and the cost may be also reduced.

Referring to FIG. 1, the voltage conversion apparatus 1 may further include a first conductive portion 12 and a second conductive portion 13. The first conductive portion 12 may include a first input terminal and a first output terminal. The first input terminal of the first conductive portion 12 may be configured to be electrically connected to a power supply unit to receive the first voltage provided by the power supply unit. The power supply unit may be, for example, at the image forming apparatus main body side (e.g., the main body side of the image forming apparatus) or the process cartridge side. For example, the process cartridge side may include a process cartridge in which a voltage conversion apparatus is installed and/or include process cartridge(s) other than the process cartridge in which the voltage conversion apparatus is installed, which may not be limited herein. The first output terminal of the first conductive portion 12 may be configured to be electrically connected to the first image-forming member. The second conductive portion 13 may include a second input terminal and a second output terminal. The second input terminal of the second conductive portion 13 may be electrically connected to the output terminal of the voltage conversion module 11, and the second output terminal of the second conductive portion 13 may be electrically connected to the second image-forming member.

In one embodiment, the input terminal of the voltage conversion module 11 may be electrically connected to the first output terminal of the first conductive portion 12. It may be understood that, in other embodiments, the input terminal of the voltage conversion module 11 may also be electrically connected to the first input terminal of the first conductive portion 12; or the input terminal of the voltage conversion module 11 may also be electrically connected to the first input terminal and the first output terminal of the first conductive portion 12 simultaneously.

In one embodiment, the first conductive portion 12 may be disposed, and the first conductive portion 12 may be electrically connected to the first image-forming member, such that the first image-forming member may form stable electrical connection with the image-forming apparatus through the first conductive portion 12; and the second conductive portion 13 may be disposed, and the second image-forming member may be electrically connected to the first conductive portion 12 through the second conductive portion 13 and the voltage conversion module 11. Therefore, the second image-forming member may form stable electrical connection with the first conductive portion 12, which may ensure the stability of voltage transmission.

Furthermore, the voltage conversion apparatus 1 may further include a circuit board, and the voltage conversion module 11 may be disposed on the circuit board.

Furthermore, the voltage conversion apparatus 1 may further include a third conductive portion; the third conductive portion may include a third input terminal and a third output terminal; and the third input terminal of the third conductive portion may be configured to be electrically connected to the first output terminal of the first conductive portion 12, and the third output terminal of the third conductive portion may be configured to be connected to the input terminal of the voltage conversion module 11.

In one embodiment, the third input terminal of the third conductive portion may be configured to electrically connect with the first output terminal of the first conductive portion 12. It may be understood that, in other embodiments, the third input terminal of the third conductive portion may also be electrically connected to the first input terminal of the first conductive portion 12; or the third input terminal of the third conductive portion may also be electrically connected to the first input terminal and the first output terminal of the first conductive portion 12 simultaneously.

In one embodiment, the voltage conversion module may include a step-down circuit. The step-down circuit may be configured to step down the first voltage to obtain the second voltage, where the absolute value of the second voltage may be less than the absolute value of the first voltage. It should be noted that the polarities of the first voltage and the second voltage may be same or different, which may not be limited herein. For example, the polarity of the first voltage may be +1500V, and the polarity of the second voltage may be −500V. That is, the voltage conversion module may not only change the magnitude of the absolute value of the voltage inputted to the voltage conversion module, but also change the polarity of the voltage.

Obviously, in other embodiments, the voltage conversion module may also include a step-up circuit, that is, the absolute value of the first voltage may be less than the absolute value of the second voltage. Exemplarily, the first image-forming member may be the photosensitive drum, and the second image-forming member may be the charging roller.

In an application scenario, the first image-forming member may receive the power provided by the power supply unit through the first conductive portion 12, and the first voltage received by the first conductive portion 12 may be transmitted to the voltage conversion module 11 through the third conductive portion. The first voltage received by the first conductive portion 12 may be converted into the second voltage by the voltage conversion module 11, and the second voltage may be transmitted to the second image-forming member through the second conductive portion 13, thereby supplying required voltage to the second image-forming member.

The required voltage of a charging roller (CR) 23 may be higher than the required voltage of a photosensitive drum (organic photoconductor OPC) 24 when the charging roller 23 is operating, and the charging roller 23 and the photosensitive drum 24 may be both located in a waste bin of the process cartridge 2 with relatively short distance. Therefore, in one embodiment, the voltage of the charging roller 23 may be stepped down by the step-down circuit to obtain a lower voltage, and the lower voltage may be provided to the photosensitive drum 24, such that the voltage of the photosensitive drum 24 may not need to be directly powered from the image-forming apparatus, and the number of conductive contacts to be disposed on the main body side of the image-forming apparatus may be reduced. Furthermore, the force between the main body side of the image-forming apparatus and the process cartridge may be decreased, the strength requirement of the main body side of the image-forming apparatus may be reduced, and the cost may also be reduced.

Based on above-mentioned embodiments, embodiments of the present disclosure also provide an image-forming assembly. The image-forming assembly may be applied to the process cartridge. The image-forming assembly may include the first image-forming member, the second image-forming member and the voltage conversion apparatus as described in any one of above-mentioned embodiments. The second image-forming member may be electrically connected to the first image-forming member through the voltage conversion apparatus, such that the voltage received by the first image-forming member may be converted into the voltage required by the second image-forming member through the voltage conversion apparatus, and the second image-forming member may operate normally. The first image-forming member may be the charging roller in the process cartridge, and the second image-forming member may be the photosensitive drum in the process cartridge.

Based on above-mentioned embodiments, embodiments of the present disclosure also provide a process cartridge, including the image-forming assembly described in above-mentioned embodiments or the voltage conversion apparatus 1 described in above-mentioned embodiments. The second image-forming member may be electrically connected to the first image-forming member through the voltage conversion apparatus 1.

Figure 3:
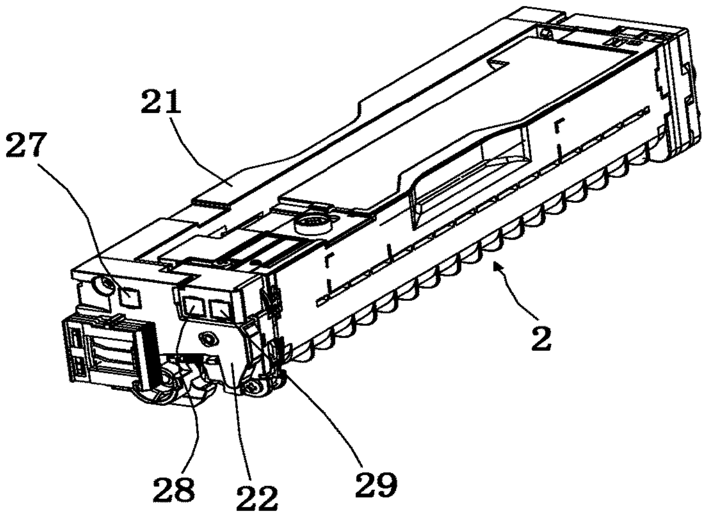
FIG. 3 illustrates a three-dimensional view of a process cartridge provided by exemplary embodiments of the present disclosure.
Figure 4:
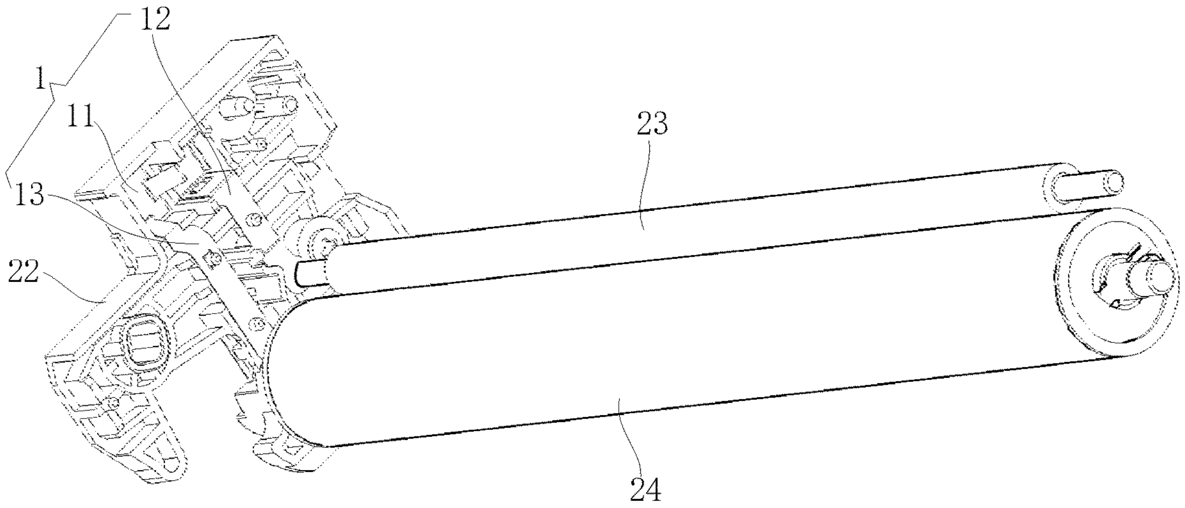
FIG. 4 illustrates a partial structural schematic of a process cartridge in FIG. 3.

Based on above-mentioned embodiments, embodiments of the present disclosure also provide a process cartridge. Referring to FIGS. 3-4, FIG. 3 illustrates a three-dimensional view of the process cartridge provided by exemplary embodiments of the present disclosure; and FIG. 4 illustrates a partial structural schematic of the process cartridge in FIG. 3. The process cartridge 2 may include a housing 21, the charging roller (CR) 23, the photosensitive drum (OPC) 24, a developing roller (DR) 25 (shown in FIG. 5), a toner supplying roller (SR) 26 (shown in FIG. 5) and a voltage conversion apparatus 1 as described in above-mentioned embodiments. The housing 21 may be disposed with an installation portion. The photosensitive drum 24, the charging roller 23, the developing roller 25, the toner supplying roller 26 and the voltage conversion apparatus 1 may be respectively installed in the installation portion; and the photosensitive drum 24 may be electrically connected to the charging roller 23 through the voltage conversion apparatus 1. The photosensitive drum 24, the charging roller 23, the developing roller 25, and the toner supplying roller 26 may all be referred to as image-forming members. In one embodiment, the charging roller 23 may be configured as the first image-forming member, and the photosensitive drum 24 may be configured as the second image-forming member.

For example, the voltage conversion apparatus 1 may include a voltage conversion module 11, the input terminal of the voltage conversion module 11 may be electrically connected to the first image-forming member, and the output terminal of the voltage conversion module 11 may be electrically connected to the second image-forming member. Therefore, the voltage conversion module 11 may convert the first voltage received by the first image-forming member into the second voltage and transmit the second voltage to the second image-forming member, such that the second image-forming member may operate normally. The first voltage may be the voltage required when the first image-forming member operates, and the second voltage may be the voltage required when the second image-forming member operates. Exemplarily, the absolute value of the second voltage may be less than the absolute value of the first voltage.

Referring to FIGS. 3-4, the housing may include end covers 22 and sidewalls. Two end covers 22 may be disposed. Two end covers 22 may be arranged oppositely, that is, respectively arranged on two ends of the process cartridge 2 along a length direction. Two sidewalls may be arranged oppositely, and the sidewalls may be connected with the end covers. The photosensitive drum 24, the charging roller 23, the developing roller 25 and the toner supplying roller 26 and the like may be all fixed between two end covers 22; and the axial directions of the photosensitive drum 24, the charging roller 23, the developing roller 25 and the toner supplying roller 26 may be in parallel with the extending direction of the housing 21. The voltage conversion apparatus 1 may be disposed on one end cover 22, and the voltage conversion apparatus 1 may be electrically connected with the photosensitive drum 24 and the end position of the charging roller 23. Therefore, the photosensitive drum 24 may be electrically connected to the charging roller 23 through the voltage conversion apparatus 1, and furthermore the photosensitive drum 24 may obtain the required voltage from the charging roller 23 through the voltage conversion apparatus 1.

For example, the process cartridge may further include a storage medium and a plurality of conductive contacts. The storage medium, each conductive contact and the voltage conversion apparatus 1 may be disposed on a same end cover 22 of the process cartridge. Each conductive contact may be configured to electrically connect to the electrical contact portion disposed on the main body of the image-forming apparatus, thereby receiving the power provided by the main body of the image-forming apparatus. For example, the conductive contacts may include a first high-voltage contact 27, a second high-voltage contact 28 and a third high-voltage contact 29. The first high-voltage contact 27 may be disposed correspondingly to the charging roller 23, the second high-voltage contact 28 may be disposed correspondingly to the developing roller 25, and the third high-voltage contact 29 may be disposed correspondingly to the toner supplying roller 26. In such way, the charging roller 23, the developing roller 25 and the toner supplying roller 26 may be electrically connected to the image-forming apparatus through the first high-voltage contact 27, the second high-voltage contact 28 and the third high-voltage contact 29 respectively, thereby obtaining the required voltage.

Furthermore, the voltage conversion apparatus 1 may further includes the first conductive portion 12, the second conductive portion 13 and the third conductive portion. The voltage conversion module 11, the first conductive portion 12, the second conductive portion 13 and the third conductive portion may be respectively disposed on one end cover 22 of the process cartridge; and the first output terminal of the first conductive portion 12 may be electrically connected to the end portion (e.g., steel axle) of the charging roller 23, and the first input terminal of the first conductive portion 12 may be electrically connected to the first high-voltage contact 27. The input terminal of the voltage conversion module 11 may be electrically connected to the first conductive portion 12 through the third conductive portion; the output terminal of the voltage conversion module 11 may be electrically connected to the second input terminal of the second conductive portion 13; and the second output terminal of the second conductive portion 13 may be electrically connected to the end portion (e.g., steel axle) of the photosensitive drum 24. Therefore, the photosensitive drum 24 may be indirectly electrically connected to the image-forming apparatus through the second conductive portion 13, the voltage conversion module 11, the third conductive portion, the first conductive portion 12 and the first high-voltage contact 27, thereby obtaining the required voltage. That is, the end cover 22 may not need to be disposed with the high-voltage contact corresponding to the photosensitive drum 24. Therefore, the image-forming apparatus may not need to be disposed with the conductive contact corresponding to the photosensitive drum 24, which may reduce the number of conductive contacts that need to be disposed on the main body side of the image-forming apparatus. Furthermore, the force between the main body side of the image-forming apparatus and the process cartridge 2 may be decreased, the strength requirement of the main body side of the image-forming apparatus may be reduced, and the cost may be also reduced.

In order to facilitate the transmission of electric energy to the outside of the process cartridge, the process cartridge may further include a fourth conductive portion. The fourth conductive portion may include a fourth input terminal and a fourth output terminal, the fourth input terminal of the fourth conductive portion may be electrically connected to the output terminal of the voltage conversion module, and the fourth output terminal of the fourth conductive portion may be configured to output the second voltage to the outside of the process cartridge. In one embodiment, the fourth output terminal of the fourth conductive portion may protrude from the sidewall of the process cartridge. Optionally, the fourth output terminal of the fourth conductive portion may elastically protrude from the sidewall of the process cartridge.

Figure 5:
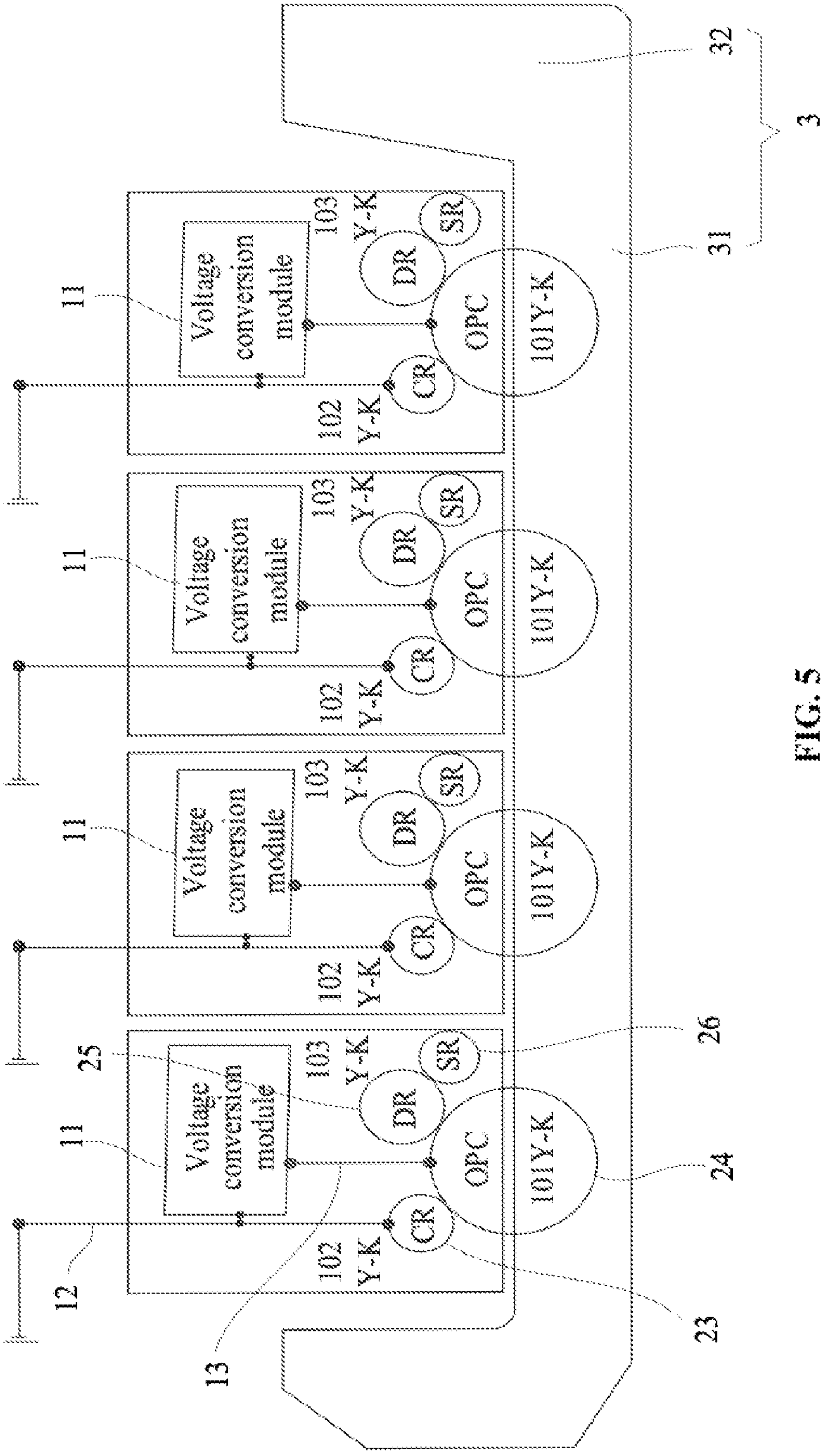
FIG. 5 illustrates a structural schematic of a process cartridge group provided by exemplary embodiments of the present disclosure.

Based on above-mentioned embodiments, embodiments of the present disclosure also provide a process cartridge group. Referring to FIG. 5, FIG. 5 illustrates a structural schematic of the process cartridge group provided by exemplary embodiments of the present disclosure. The process cartridge group may include a plurality of process cartridges 100 described in above-mentioned embodiments, and all process cartridges 100 may be arranged in a row.

For example, the toner colors in the plurality of process cartridges 100 may be same or different. For example, the plurality of process cartridges 100 may include a first process cartridge 100(K), a second process cartridge 100(M), a third process cartridge 100(C) and a fourth process cartridge 100(Y), where K, M, C and Y denotes toner colors. Exemplarily, the toner of a different color may be stored in each process cartridge 100, such that the image-forming apparatus may form black images or color images on paper.

In order to facilitate simultaneous uninstallation and installation of the plurality of process cartridges 100, such as the first process cartridge 100(K), the second process cartridge 100(M), the third process cartridge 100(C) and the fourth process cartridge 100(Y), in some embodiments, the process cartridge group may further include a movable part 3 which is movably installed in the main body of the image-forming apparatus and configured to accommodate the plurality of process cartridges such as the first process cartridge 100(K), the second process cartridge 100(M), the third process cartridge 100(C) and the fourth process cartridge 100(Y). When the movable part 3 is located outside the main body of the image-forming apparatus, the plurality of process cartridges 100 may be removed from the movable part 3. That is, a user may move the plurality of process cartridges 100 simultaneously by pushing and pulling the movable part 3, which may be more convenient for uninstallation and installation.

The movable part 3 may be a rod-shaped or plate-shaped structural part. In some embodiments, the movable part 3 may include a bottom plate 31 and a side plate 32. The bottom plate 31 and the side plate 32 may be connected to form a chamber with an opening. The bottom plate 31 may be configured to support the plurality of process cartridges such as the first process cartridge 100(K), the second process cartridge 100(M), the third process cartridge 100(C) and the fourth process cartridge 100(Y). The side plate 32 may surrounds the outer sides of the plurality of process cartridges 100 and be configured to limit each process cartridge 100, such that each process cartridge 100 may be stably installed on the movable part 3.

In some embodiments, a locking groove may be formed on the side plate 32 for locking with each process cartridge 100, such that each process cartridge 100 may be relatively fixed to the movable part, and each process cartridge 100 may be prevented from shifting relative to the movable part 3.

In an actual application scenario, when entire process cartridge group is pushed into the image-forming apparatus, the charging roller 23, the developing roller 25 and the toner supplying roller 26 of each process cartridge may be electrically connected with the image-forming apparatus through the first high-voltage contact 27, the second high-voltage contact 28 and the third high-voltage contact 29 respectively to obtain the required voltage; and the photosensitive drum 24 may be indirectly electrically connected to the image-forming apparatus through the second conductive portion 13, the voltage conversion module 11, the third conductive portion, the first conductive portion 12 and the first high-voltage contact 27 to obtain the voltage. Therefore, the charging roller 23, the photosensitive drum 24, the developing roller 25 and the toner supplying roller 26 may all operate normally, and each process cartridge may be independent without interfering with each other.

Based on above-mentioned embodiments, embodiments of the present disclosure also provide a process cartridge group. The process cartridge group may include the first process cartridge and the second process cartridge. The first process cartridge may include the first image-forming member, the second image-forming member, the voltage conversion apparatus, and the fourth conductive portion. The voltage conversion apparatus may include the voltage conversion module, the input terminal of the voltage conversion module may be electrically connected to the first image-forming member, and the output terminal of the voltage conversion module may be electrically connected to the second image-forming member. Therefore, the first voltage received by the first image-forming member may be converted into the second voltage by the voltage conversion module, and the second voltage may be transmitted to the second image-forming member. The fourth conductive portion may include the fourth input terminal and the fourth output terminal, the fourth input terminal of the fourth conductive portion may be electrically connected to the voltage conversion module, and the fourth output terminal of the fourth conductive portion may be configured to transmit power to the outside of the first process cartridge. The second process cartridge may include the third image-forming member and a conductive unit. The conductive unit may include an electric receiving portion and an electric outputting portion. The electric receiving portion of the conductive unit may be configured to be electrically connected to the fourth output terminal of the fourth conductive portion to receive the power transmitted by the fourth conductive portion; and the electrical outputting portion of the electrical unit may be electrically connected with the third image-forming member to transmit power to the third image-forming member. The second image-forming member and the third image-forming member refer to a same type of components, such as photosensitive drums. The first voltage may be the voltage required when the first image-forming member operates; and the second voltage may be the voltage required when the second image-forming member and the third image-forming member operate.

In one embodiment, the fourth input terminal of the fourth conductive portion may be electrically connected to the input terminal of the voltage conversion module. At this point, the voltage outputted from the fourth output terminal of the fourth conductive portion may be the first voltage. The conductive unit may further include a voltage conversion unit. The voltage conversion unit may be electrically connected to the fourth output terminal of the fourth conduction part through the electric receiving portion to receive the first voltage transmitted by the fourth output terminal of the fourth conduction part. The voltage conversion unit may be electrically connected to the third image-forming member through an electrical output terminal, such that the first voltage may be converted into the second voltage by the voltage conversion unit, and the second voltage may be transmitted to the third image-forming member, and the third image-forming member of the second process cartridge may obtain the voltage required for operation. It may be understood that, in other embodiments, the fourth input terminal of the fourth conductive portion may be electrically connected to the output terminal of the voltage conversion module. At this point, the voltage outputted from the fourth output terminal of the fourth conductive portion may be the second voltage. The electrical receiving portion of the conductive unit may be electrically connected to the fourth output terminal of the fourth conductive portion to receive the second voltage outputted by the fourth output terminal of the fourth conductive portion and transmit the second voltage to the third image-forming member, such that the third image-forming member of the second process cartridge may obtain the voltage required for operation.

In order to facilitate the second process cartridge to transmit power to the outside, the conductive unit of the second process cartridge may further include a conductive connection terminal. The conductive connection terminal may be electrically connected to the electric receiving portion or the electric outputting portion; and the power may be transmitted to the outside of the second process cartridge through the conductive connection terminal. At least a part of the electric receiving portion and the conductive connection terminal may be installed outside the housing of the second process cartridge, and at least a part of the fourth output terminal of the fourth conductive portion may be installed outside the housing of the first process cartridge.

Figure 6:
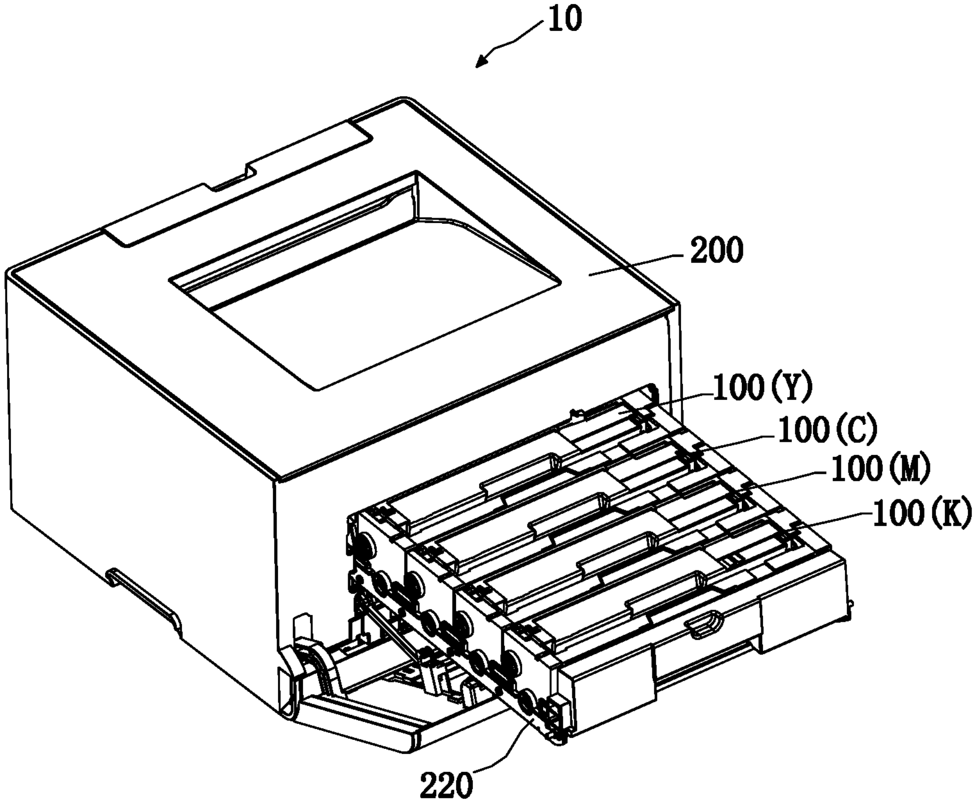
FIG. 6 illustrates a structural schematic of an image-forming apparatus provided by exemplary embodiments of the present disclosure.

Based on above-mentioned embodiments, embodiments of the present disclosure further provide an image-forming apparatus 10 which may be a laser printer, a laser copier, or the like. Referring to FIG. 6, the image-forming apparatus may include a main body 200 and a process cartridge or a process cartridge group as described in above-mentioned embodiments. The process cartridge or process cartridge group may be detachably installed in the main body 200 of the image-forming apparatus.

For example, the image-forming apparatus 10 may further include an optical scanning unit (not shown), a paper feeding unit (not shown), a fixing unit (not shown), the process cartridge group described below and the like which are disposed on the main body 200. The operating principle and process of the image-forming apparatus 10 are as follows. The optical scanning unit may expose image information on the process cartridge to convert the image information into an electrostatic latent image; the process cartridge may convert the electrostatic latent image into a toner image; the paper feeding unit may transfer paper to the location of the process cartridge, such that the toner image may be transferred to the paper; next, the paper feeding unit may send the paper to the fixing unit, and the toner image may be fixed on the paper by heating and pressing; and then the paper feeding unit may output the paper to the outside of the image-forming apparatus 10.

Figure 7:
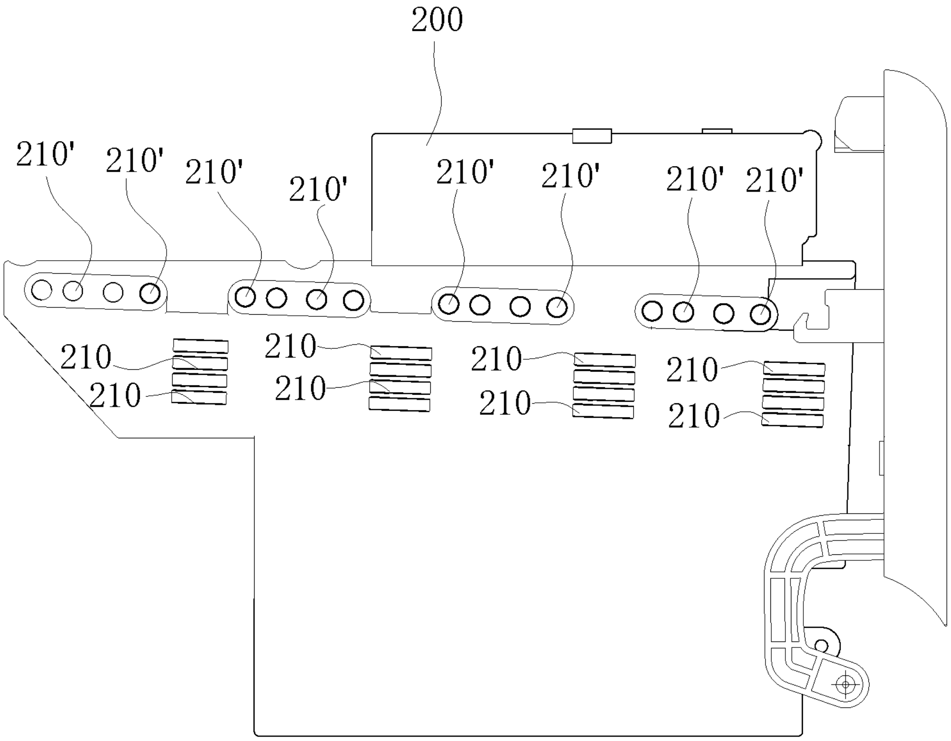
FIG. 7 illustrates a structural schematic of conductive terminals disposed on a main body of an image-forming apparatus in FIG. 6.
Figure 8:
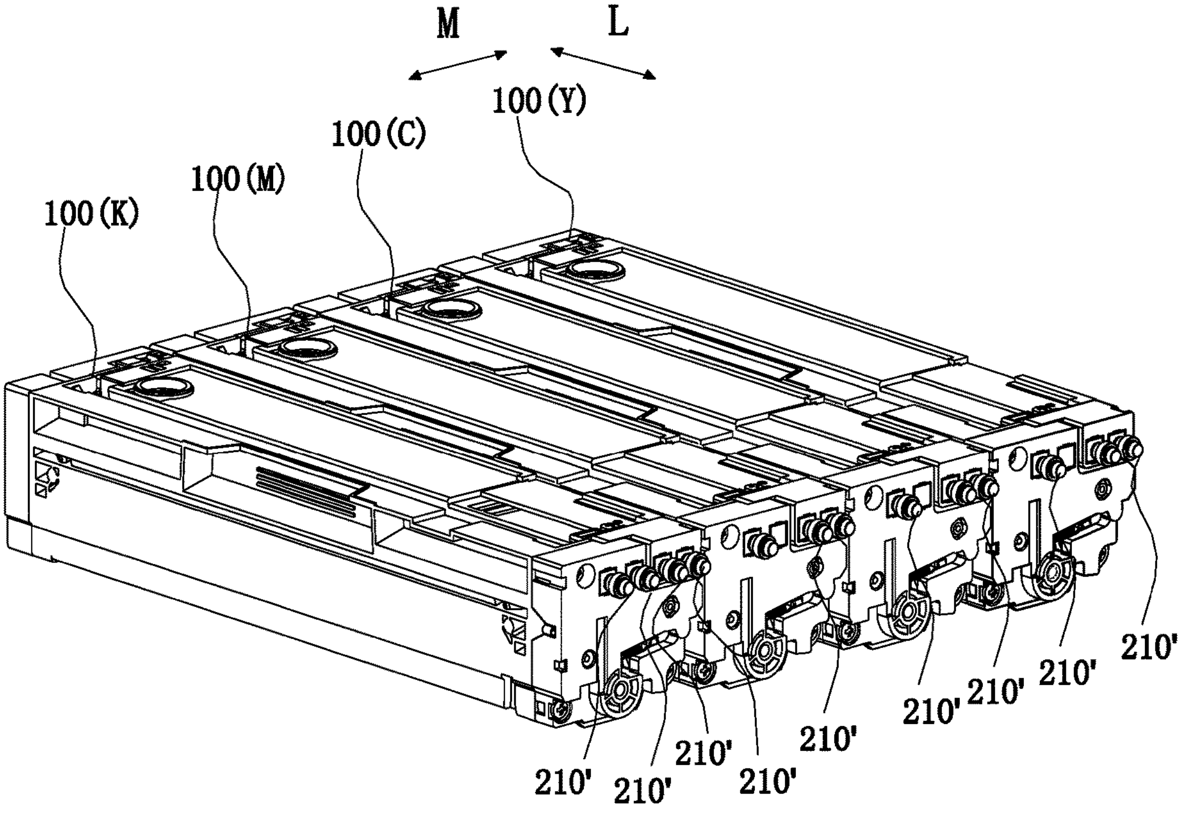
FIG. 8 illustrates a structural schematic of a process cartridge group in FIG. 6.

Referring to FIGS. 7 and 8, the main body 200 may be disposed with a first conductive terminal 210 and a second conductive terminal 210'; and the first conductive terminal 210 may be configured to be electrically connected to a storage device of the process cartridge, and the second conductive terminal 210' may be configured to be electrically connected to the high-voltage contact of the process cartridge, such that the image-forming member may be electrically connected to an external conductive structural part. The second conductive terminal 210' at the main body side may be referred to as the external conductive structural part. It may be understood that the second conductive terminal 210' on the main body side may be understood as an electrical connection structure connected to a high-voltage contact and may not be limited to the contact position with the high-voltage contact.

Figure 9:
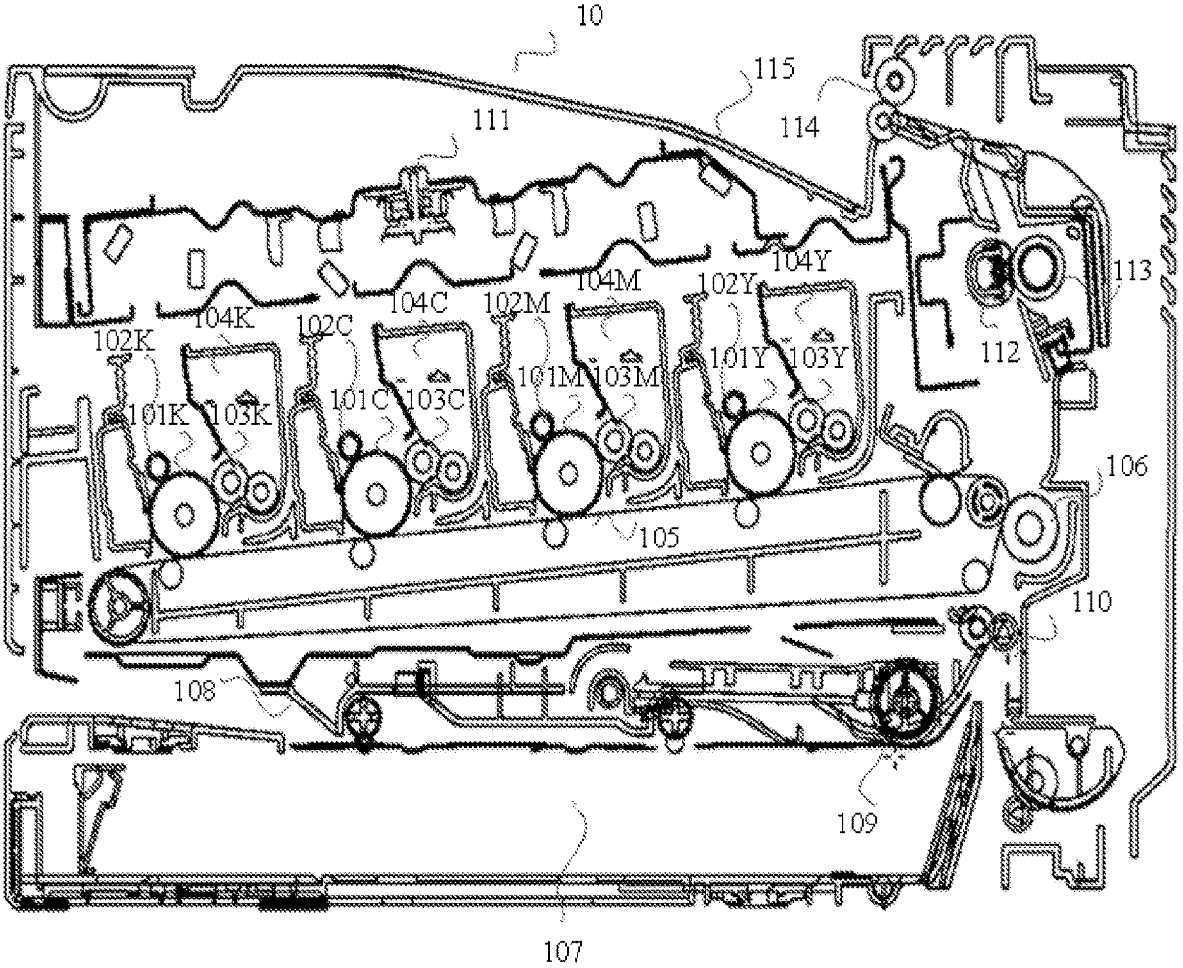
FIG. 9 illustrates another structural schematic of an image-forming apparatus provided by exemplary embodiments of the present disclosure.

Based on above-mentioned embodiments, the present disclosure further provides another image-forming apparatus. The image-forming apparatus may be a color laser printer. Referring to FIG. 9, the image-forming apparatus 10 may include the process cartridge or the process cartridge group described in above-mentioned embodiments, a transferring belt 105, a secondary transferring roller 106, a paper tray 107, a manual paper feeding tray 108, a paper feeding roller 109, a conveying roller 110, a laser scanning unit (LSU) 111, a heating roller 112, a pressing roller 113, a discharging roller 114, a paper discharging tray 115 and the like. The plurality of process cartridges may be configured in the present disclosure. Each process cartridge may respectively include one of photosensitive drums 101Y-101K, one of charging rollers 102Y-102K, one of developing rollers 103Y-103K, and one of toner hoppers 104Y-104K for holding toner.

The laser scanning unit (LSU) 111 may be in the form of a single LSU including four beam paths. Four charging rollers 102Y-102K may be configured to charge the surfaces of four photosensitive drums 101Y-101K respectively. Four optical paths of the laser scanning unit may respectively emit laser beams to form electrostatic latent images on the surfaces of the photosensitive drums 101Y-101K. Four developing rollers (DR) 103Y-103K may be configured to develop and form a toner image of one color on each of the surfaces of the photosensitive drums 101Y-101K respectively, and the image-forming apparatus 10 may adopt a secondary transferring manner. That is, four photosensitive drums 101Y-101K may sequentially transfer the toner images to the transferring belt 105, and then the color toner image formed on the transfer belt 105 may be secondarily transferred to the paper through the secondary transferring roller 106. The paper tray 107 is configured to store paper, and the paper feeding roller 109 may be configured to convey stored paper to the conveying path. The conveying roller 110 may be configured to convey the paper to the secondary transferring roller 106.

The secondary transferring roller 106 may convey the paper with the image to the clamping region between the heating roller 112 and the pressing roller 113. The heating roller 112 and the pressing roller 113 may be configured to fix the toner image on the paper. Heating roller 112 may adopt a ceramic heating manner. The heating roller 112 and the pressing roller 113 may convey the fixed paper to the discharging roller 114. The discharging roller 114 may discharge the paper to the paper discharging tray 115 to be stacked.

Figure 10:
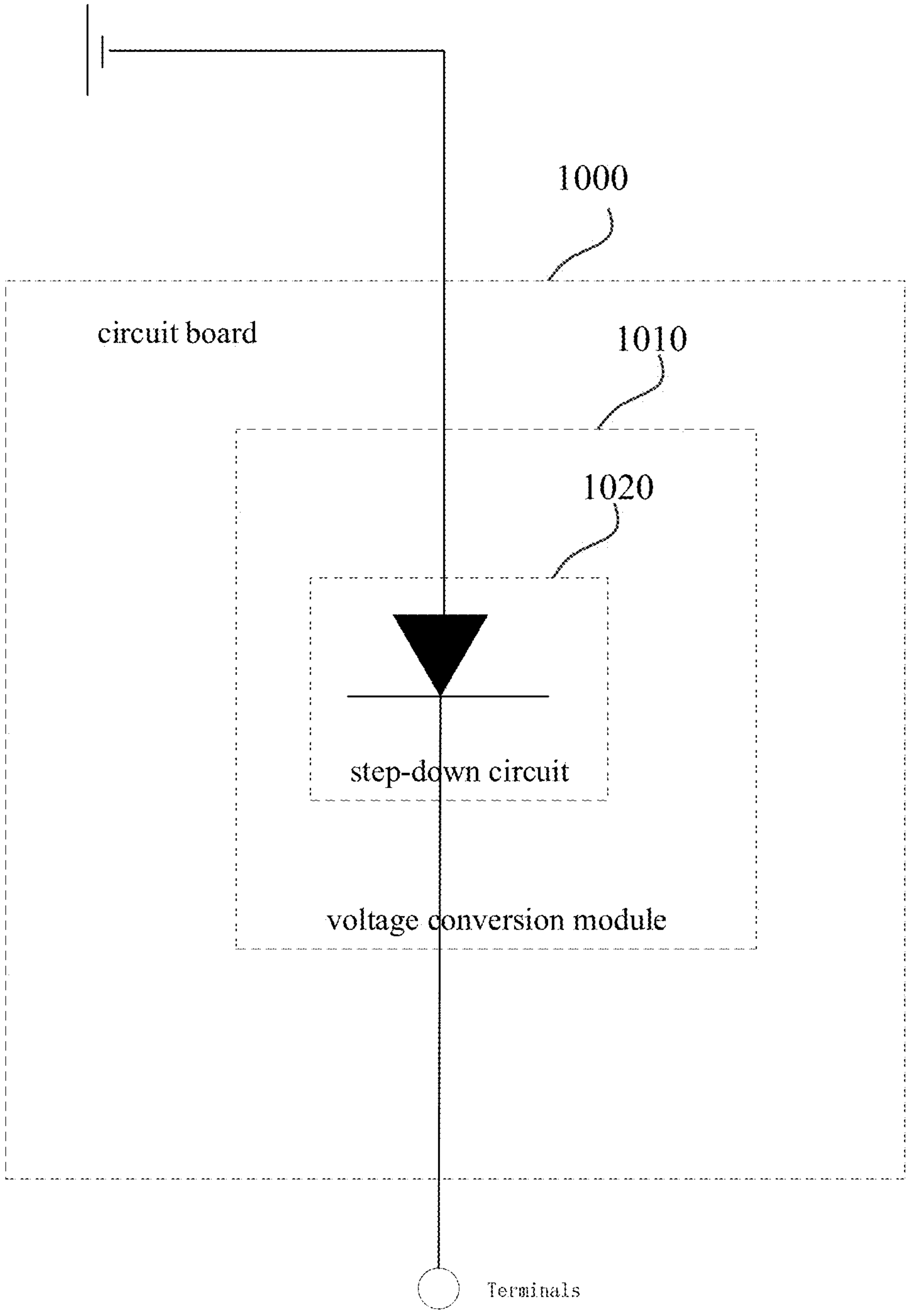
FIG. 10 illustrates a structural schematic of a circuit board on which a voltage conversion module is disposed provided by exemplary embodiments of the present disclosure.

FIG. 10 illustrates a structural schematic of a circuit board 1000 on which a voltage conversion module is disposed provided by exemplary embodiments of the present disclosure. As shown in FIG. 10, a voltage conversion module 1010 is disposed on the circuit board 1000. The voltage conversion module 1010 includes a step-down circuit 1020.

Figure 11:
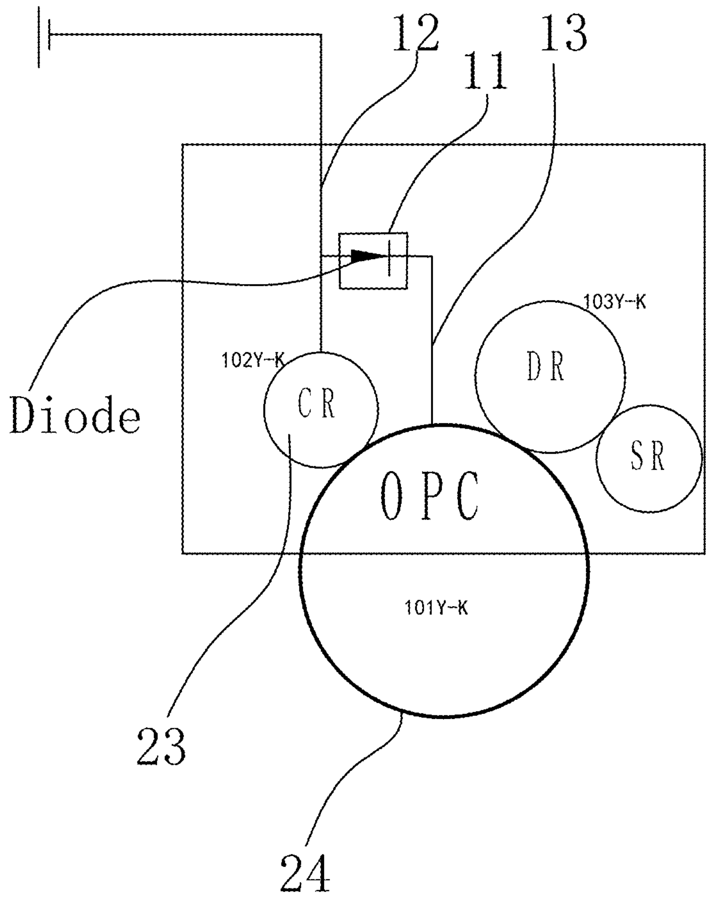
FIG. 11 illustrates a structural schematic of electrical connection between a voltage conversion apparatus including a diode and each image-forming member in a process cartridge provided by exemplary embodiments of the present disclosure.

FIG. 11 illustrates a structural schematic of electrical connection between a voltage conversion apparatus including a diode and each image-forming member in a process cartridge provided by exemplary embodiments of the present disclosure. Compared with FIG. 1, the voltage conversion module 11 may include a diode.

Figure 12:
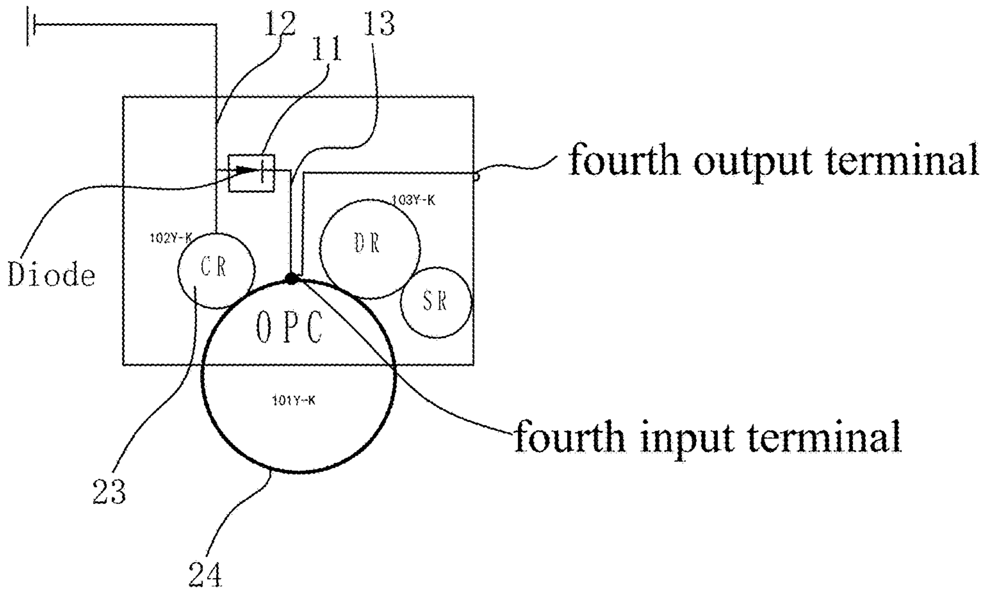
FIG. 12 illustrates a structural schematic of electrical connection between a voltage conversion apparatus including a fourth conductive portion and each image-forming member in a process cartridge provided by exemplary embodiments of the present disclosure.

FIG. 12 illustrates a structural schematic of electrical connection between a voltage conversion apparatus including a fourth conductive portion and each image-forming member in a process cartridge provided by exemplary embodiments of the present disclosure. Compared with FIG. 11, the voltage conversion apparatus may further include a fourth conductive portion. The fourth conductive portion may include a fourth input terminal and a fourth output terminal.

Figure 13:
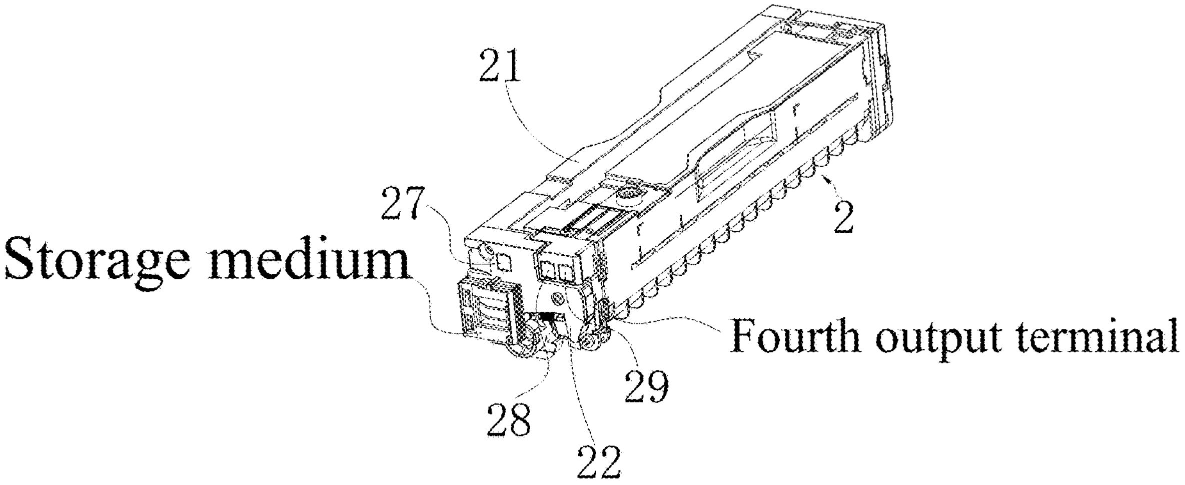
FIG. 13 illustrates a three-dimensional view of a process cartridge provided by exemplary embodiments of the present disclosure.

FIG. 13 illustrates a three-dimensional view of a process cartridge provided by exemplary embodiments of the present disclosure. As shown in FIG. 13, the storage medium and the voltage conversion apparatus are disposed on a same end cover of the two end covers, and the fourth output terminal elastically protrudes from the sidewall of the process cartridge.

Figure 14:
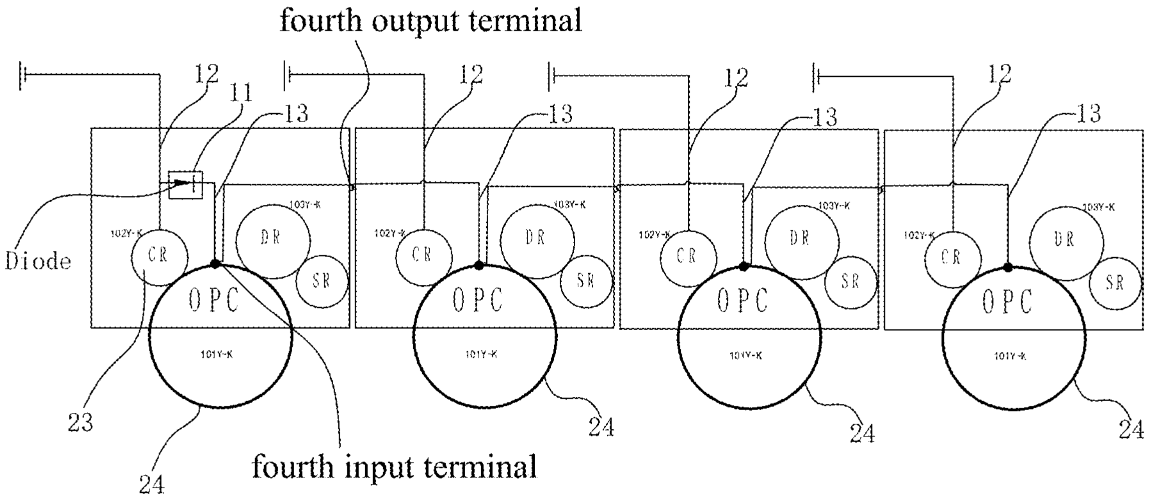
FIG. 14 illustrates a structural schematic of a process cartridge group provided by exemplary embodiments of the present disclosure.

FIG. 14 illustrates a structural schematic of a process cartridge group provided by exemplary embodiments of the present disclosure. As shown in FIG. 14, the voltage conversion module 11 may include a diode, and the voltage conversion apparatus may further include a fourth conductive portion. The fourth conductive portion may include a fourth input terminal and a fourth output terminal.

From above-mentioned embodiments, it can be seen that the solutions provided in the present disclosure may achieve at least following beneficial effects.

Compared with the existing technology, the voltage conversion apparatus of the present disclosure includes the voltage conversion module; the input terminal of the voltage conversion module is configured to be electrically connected to the first image-forming member; the output terminal of the voltage conversion module is configured to be electrically connected to the second image-forming member; and through the voltage conversion module, the first voltage received by the first image-forming member is converted into the second voltage, and the second voltage is transmitted to the second image-forming member. The first voltage is the voltage required for the first image-forming member to operate, and the second voltage is the voltage required for the second image-forming member to operate. That is, the second image-forming member obtains the required voltage from the first image-forming member through the voltage conversion module. Therefore, there is no need to dispose conductive contacts for directly supplying power to the second image-forming member on the image-forming apparatus, which may reduce the number of conductive contacts to be disposed on the main body side of the image-forming apparatus. Furthermore, the force between the main body side of the image-forming apparatus and the process cartridge is decreased, the strength requirement of the main body side of the image-forming apparatus is reduced, and the cost is also reduced.

Above may be merely optional embodiments of the present disclosure, which may not be intended to limit the present disclosure. Any changes or substitutions that may be easily conceived by those skilled in the art within the technical scope disclosed in the present disclosure shall fall within the protection scope of the present disclosure. Therefore, the protection scope of the present disclosure should be based on the protection scope of the claims.

What is claimed is:

1. A voltage conversion apparatus, applied to a process cartridge, wherein the process cartridge includes a first image-forming member and a second image-forming member, comprising:

a voltage conversion module, wherein an input terminal of the voltage conversion module is configured to be electrically connected to the first image-forming member, and an output terminal of the voltage conversion module is configured to be electrically connected to the second image-forming member; and the voltage conversion module is configured to convert a first voltage received by the first image-forming member into a second voltage, wherein:

the first voltage is a voltage required for the first image-forming member to operate, and the second voltage is a voltage required for the second image-forming member to operate, and:

the first image-forming member is a charging member, and the second image-forming member is a photosensitive member.

2. The voltage conversion apparatus according to claim 1, further including:

a circuit board, wherein the voltage conversion module is disposed on the circuit board.

3. The voltage conversion apparatus according to claim 1, further including:

a first conductive portion, wherein the first conductive portion includes a first input terminal and a first output terminal; the first input terminal is configured to receive the first voltage provided by a power supply unit, and the first output terminal is configured to be electrically connected to the first image-forming member; and the input terminal of the voltage conversion module is electrically connected to at least one of the first input terminal and the first output terminal; and/or a second conductive portion, wherein the second conductive portion includes a second input terminal and a second output terminal; and the second input terminal is electrically connected with the output terminal of the voltage conversion module, and the second output terminal is electrically connected to the second image-forming member.

4. The voltage conversion apparatus according to claim 3, further including:

a third conductive portion, wherein the third conductive portion includes a third input terminal and a third output terminal; the third input terminal is electrically connected to at least one of the first input terminal and the first output terminal; and the third output terminal is electrically connected to the input terminal of the voltage conversion module.

5. The voltage conversion apparatus according to claim 1, wherein:

the voltage conversion module includes a step-down circuit; and the step-down circuit is configured to step down the first voltage to obtain the second voltage, wherein an absolute value of the second voltage is less than an absolute value of the first voltage.

6. A process cartridge, comprising:

a housing, a first image-forming member, a second image-forming member, and a voltage conversion apparatus, wherein:

the housing is disposed with an installation portion; and the first image-forming member, the second image-forming member, and the voltage conversion apparatus are respectively installed on the installation portion; and the second image-forming member is electrically connected to the first image-forming member via the voltage conversion apparatus; and the voltage conversion apparatus includes a voltage conversion module; an input terminal of the voltage conversion module is configured to be electrically connected to the first image-forming member, and an output terminal of the voltage conversion module is configured to be electrically connected to the second image-forming member; and the voltage conversion module is configured to convert a first voltage received by the first image-forming member into a second voltage, wherein the first voltage is a voltage required for the first image-forming member to operate, and the second voltage is a voltage required for the second image-forming member to operate; and the first image-forming member is a charging member, and the second image-forming member is a photosensitive member.

7. The process cartridge according to claim 6, wherein:

the voltage conversion apparatus further includes a circuit board, and the voltage conversion module is disposed on the circuit board.

8. The process cartridge according to claim 6, wherein:

the voltage conversion apparatus further includes a first conductive portion; the first conductive portion includes a first input terminal and a first output terminal; the first input terminal is configured to receive the first voltage provided by a power supply unit, and the first output terminal is configured to be electrically connected to the first image-forming member; and the input terminal of the voltage conversion module is electrically connected to at least one of the first input terminal and the first output terminal; and/or the voltage conversion apparatus further includes a second conductive portion; the second conductive portion includes a second input terminal and a second output terminal; and the second input terminal is electrically connected with the output terminal of the voltage conversion module, and the second output terminal is electrically connected to the second image-forming member.

9. The process cartridge according to claim 8, wherein:

the voltage conversion apparatus includes a third conductive portion; the third conductive portion includes a third input terminal and a third output terminal; the third input terminal is electrically connected to at least one of the first input terminal and the first output terminal; and the third output terminal is electrically connected to the input terminal of the voltage conversion module.

10. The process cartridge according to claim 6, wherein:

the voltage conversion module includes a step-down circuit; and the step-down circuit is configured to step down the first voltage to obtain the second voltage, wherein an absolute value of the second voltage is less than an absolute value of the first voltage.

11. The process cartridge according to claim 6, wherein:

the housing includes two end covers and two sidewalls; the two end covers are disposed to be opposite to each other; the two sidewalls are disposed to be opposite to each other; an end cover of the two end covers is connected to a corresponding sidewall; the first image-forming member and the second image-forming member are disposed between the two end covers; the voltage conversion apparatus is disposed on one of the two end covers; and the voltage conversion apparatus is electrically connected to end positions of the first image-forming member and the second image-forming member.

12. The process cartridge according to claim 11, further including:

a storage medium, wherein the storage medium and the voltage conversion apparatus are disposed on a same end cover of the two end covers.

13. The process cartridge according to claim 12, further including:

a plurality of conductive contacts, wherein the plurality of the conductive contacts and the voltage conversion apparatus are disposed on a same end cover of the two end covers; and the plurality of conductive contacts is configured to be electrically connected to electrical contact portions disposed on a main body of an image-forming apparatus to receive power provided by the main body of the image-forming apparatus.

14. The process cartridge according to claim 6, further including:

a fourth conductive portion, wherein the fourth conductive portion includes a fourth input terminal and a fourth output terminal; the fourth input terminal is electrically connected to the output terminal of the voltage conversion module; the fourth output terminal is configured to output the second voltage to an outside of the process cartridge; and the fourth output terminal protrudes from a sidewall of the process cartridge.

15. The process cartridge according to claim 14, wherein:

the fourth output terminal elastically protrudes from the sidewall of the process cartridge.

16. A process cartridge group, comprising:

a first process cartridge, including a first image-forming member, a second image-forming member, a voltage conversion apparatus and a conductive portion, wherein:

the second image-forming member is electrically connected to the first image-forming member through the voltage conversion apparatus; the voltage conversion apparatus includes a voltage conversion module; an input terminal of the voltage conversion module is electrically connected to the first image-forming member; an output terminal of the voltage conversion module is electrically connected to the second image-forming member; the voltage conversion module is configured to convert a first voltage received by the first image-forming member into a second voltage, wherein the first voltage is a voltage required for the first image-forming member to operate, and the second voltage is a voltage required for the second image-forming member to operate; the conductive portion includes an input terminal and an output terminal; the input terminal is electrically connected to the voltage conversion module; and the output terminal is configured to transmit power to an outside of the first process cartridge; and a second process cartridge, including a third image-forming member and a conductive unit, wherein:

the conductive unit includes an electric receiving portion and an electric outputting portion; the electric receiving portion is configured to be electrically connected to the output terminal to receive power transmitted by the conductive portion; and the electric outputting portion is electrically connected to the third image-forming member; and the first image-forming member is a charging member, and the second image-forming member is a photosensitive member.

17. The process cartridge group according to claim 16, wherein:

the input terminal of the conductive portion is electrically connected to the input terminal of the voltage conversion module; and the electric receiving portion is electrically connected to the output terminal to receive the second voltage transmitted by the output terminal; and the conductive unit further includes a voltage conversion unit; the voltage conversion unit is electrically connected to the output terminal through the electric receiving portion to receive the first voltage transmitted by the output terminal; and the voltage conversion unit is electrically connected to the third image-forming member through the electric outputting portion.

18. The process cartridge group according to claim 16, wherein:

the conductive unit of the second process cartridge further includes a conductive connection terminal; the conductive connection terminal is electrically connected to the electric receiving portion or the electric outputting portion; the conductive connection terminal is configured to supply power to an outside of the second process cartridge; and at least a part of the electric receiving portion and the conductive connection terminal is installed outside a housing of the second process cartridge.

19. The process cartridge group according to claim 16, wherein:

at least a part of the output terminal is installed outside a housing of the first process cartridge.

20. The process cartridge group according to claim 16, wherein:

the voltage conversion module includes a step-down circuit; and the step-down circuit is configured to step down the first voltage to obtain the second voltage, wherein an absolute value of the second voltage is less than an absolute value of the first voltage.

* * * * *